United States Patent
Peterson et al.

(10) Patent No.: US 10,044,514 B1
(45) Date of Patent: Aug. 7, 2018

(54) SECURE EXTERNAL KEY STORAGE FOR PROGRAMMABLE ICS

(71) Applicant: Xilinx, Inc., San Jose, CA (US)

(72) Inventors: Edward S. Peterson, Gilbert, AZ (US); James D. Wesselkamper, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 175 days.

(21) Appl. No.: 14/866,712

(22) Filed: Sep. 25, 2015

(51) Int. Cl.
- *G06F 11/30* (2006.01)
- *H04L 9/32* (2006.01)
- *H04L 9/14* (2006.01)

(52) U.S. Cl.
CPC .............. *H04L 9/3278* (2013.01); *H04L 9/14* (2013.01); *H04L 2209/24* (2013.01)

(58) Field of Classification Search
CPC .. G06F 15/177; G06F 17/5054; G06F 21/575; G06F 21/76; G06F 21/72; G06F 21/71; G06F 21/572; H04L 9/0877; H04L 9/3278; H04L 9/08
See application file for complete search history.

(56) References Cited

U.S. PATENT DOCUMENTS

| | | | | |
|---|---|---|---|---|
| 6,351,536 B1* | 2/2002 | Sasaki | ................... | G06F 21/606 380/255 |
| 8,813,247 B1* | 8/2014 | Alten | ..................... | G06F 21/31 380/45 |
| 9,208,355 B1* | 12/2015 | Areno | ..................... | G06F 21/73 |
| 2002/0095382 A1* | 7/2002 | Taoka | ..................... | G06F 21/10 705/50 |
| 2002/0152392 A1* | 10/2002 | Hardy | ..................... | G06F 21/10 713/189 |
| 2008/0263363 A1* | 10/2008 | Jueneman | ............... | G06F 21/32 713/184 |
| 2010/0125739 A1* | 5/2010 | Creary | ................... | H04L 9/0822 713/189 |
| 2012/0137119 A1* | 5/2012 | Doerr | .................... | G06F 15/167 713/100 |

(Continued)

FOREIGN PATENT DOCUMENTS

EP 1422591 A1 * 5/2004 ............ G06F 21/123

OTHER PUBLICATIONS

Peterson: Developing Tamper Resistant Designs with Xilinx Virtex-6 and 7 Series FPGAs; Oct. 15, 2013, Xilinx, pp. 1-20.*

(Continued)

*Primary Examiner* — Farid Homayounmehr
*Assistant Examiner* — Lizbeth Torres-Diaz
(74) *Attorney, Agent, or Firm* — LeRoy D. Maunu

(57) ABSTRACT

The disclosure describes approaches for protecting a circuit design for a programmable integrated circuit (IC). A black key is generated from an input red key by a registration circuit implemented on the programmable IC, and the black key is stored in a memory circuit external to the programmable IC. The programmable IC is configured to implement a pre-configuration circuit, which inputs the black key from the memory circuit and generates the red key from the black key. A ciphertext circuit design is decrypted into a plaintext circuit design by the programmable IC using the red key, and the red key is erased from the programmable IC. The programmable IC is reconfigured with the plaintext circuit design.

15 Claims, 5 Drawing Sheets

(56) References Cited

U.S. PATENT DOCUMENTS

| | | | | |
|---|---|---|---|---|
| 2014/0095867 | A1* | 4/2014 | Smith | H04L 9/0822 713/164 |
| 2015/0086012 | A1* | 3/2015 | Chhabra | H04N 21/4122 380/200 |
| 2015/0100793 | A1* | 4/2015 | Newell | G06F 21/76 713/189 |
| 2015/0277821 | A1* | 10/2015 | Mori | G06F 3/1236 358/1.15 |
| 2015/0381592 | A1* | 12/2015 | Khazan | G06F 21/602 713/171 |

OTHER PUBLICATIONS

Xilinx, Inc., Peterson, E., Developing Tamper Resistant Designs with Xilinx Virtex-6 and 7 Series FPGAs, Application Note, Virtex-6 and 7 Series FPGAs, and Zynq-7000 AP SoCs, XAPP1084 v1.3, Oct. 15, 2013, pp. 1-20, San Jose, CA USA.

\* cited by examiner

SECURE EXTERNAL KEY STORAGE FOR PROGRAMMABLE ICS

TECHNICAL FIELD

The disclosure generally relates to storage of encryption keys used to protect electronic circuit designs.

BACKGROUND

Programmable integrated circuits (ICs) are user configurable and capable of implementing digital logic operations. There are several types of programmable ICs, including Complex Programmable Logic Devices (CPLDs) and Field Programmable Gate Arrays (FPGAs), and System on Chips (SOCs), for example. CPLDs include function blocks based on programmable logic array (PLA) architecture and programmable interconnect lines to route and transmit signals between the function blocks. FPGAs may include configurable logic blocks (CLBs) arranged in rows and columns, input output blocks (IOBs) surrounding the CLBs, and programmable interconnect lines that route and transmit signals between the CLBs. In other FPGAs, IOBs are arranged in columns between the columns of other logic. Each CLB includes look-up tables and other configurable circuitry that is programmable to implement a logic function. The function blocks of CPLDs, CLBs of FPGAs and interconnect lines are configured by data stored in a configuration memory of the respective devices. SOCs may include in a single die or package, one or more general purposes of special purpose processor cores, memory, input/output circuitry, and programmable logic.

Designs implemented on programmable ICs have become complex. Due to the time and investment required for design and debugging, it is desirable to protect the design from unauthorized copying. Many programmable logic ICs use volatile configuration memory that must be loaded from an external device, such as a Programmable Read-Only Memory (PROM), every time the programmable logic is powered up. Since configuration data is stored external to the programmable logic and must be transmitted through a configuration access port, the design can easily be revealed to an attacker by monitoring the data on the configuration access port during configuration. Other programmable logic ICs, including some FPGAs, include at least some non-volatile configuration memory within the device. However, even when a device is configured with internally stored configuration memory, configuration data can still be accessed if the designer releases configuration data to update the device.

Efforts have been made to encrypt designs, but it is difficult to make the design both secure from attackers and easy to upgrade by legitimate users. Several encryption algorithms, for example, the standard Data Encryption Standard (DES) and the more secure Advanced Encryption Standard (AES) algorithms, are known for encrypting blocks of data. However, a key must somehow be communicated in a secure way to the structure that decrypts the design, so the design can be decrypted before being used to configure the programmable logic. Once the programmable logic has been configured using the unencrypted design, the design must continue to be protected from unauthorized discovery.

A decryption key may be stored in non-volatile memory of a programmable integrated circuit (IC), and an encrypted bitstream may be loaded into the IC and decrypted using the key within the programmable IC. This prevents an attacker from reading the bitstream as it is being loaded into the programmable IC. However, this structure may not protect against obtaining the decryption key from the memory cells through reverse engineering. Also, a battery may be required for backup power to maintain the decryption key in the IC.

SUMMARY

In one embodiment, a method of protecting a circuit design for a programmable integrated circuit (IC), includes generating a black key from an input red key by a registration circuit implemented on the programmable IC. The black key is stored in a memory circuit external to the programmable IC. To configure the programmable IC to implement the circuit design, the programmable IC is first configured to implement a pre-configuration circuit. The black key is input from the memory circuit to the pre-configuration circuit, and the pre-configuration circuit generates the red key from the black key by the pre-configuration circuit. A ciphertext circuit design is decrypted into a plaintext circuit design by the programmable IC using the red key, and the red key is then erased from internal memory of the programmable IC. The programmable IC is then reconfigured with the plaintext circuit design.

In another method of protecting a circuit design for a programmable integrated circuit (IC), the programmable IC is configured to implement a first instance of a PUF circuit and a wrapper circuit. A first instance of a PUF value is generated by the first instance of the PUF circuit, and a first instance of a red key is input to the wrapper circuit. The wrapper circuit generates a black key as a function of the first instance of the PUF value and the first instance of the red key and stores the black key in a memory circuit external to the programmable IC. The black key may then be subsequently used in configuring the programmable IC with a ciphertext circuit design. The programmable IC is reconfigured to implement a second instance of the PUF circuit and an unwrapper circuit. The second instance of the PUF circuit generates a second instance of the PUF value, and the black key is input from the external memory circuit to the unwrapper circuit. The unwrapper circuit generates a second instance of the red key as a function of the black key and the second instance of the PUF value. The ciphertext circuit design is input to the programmable IC, and a decryption circuit of the programmable IC decrypts the ciphertext circuit design into a plaintext circuit design using the second instance of the red key. After decryption, the second instance of the red key is erased from the programmable IC, and the programmable IC is configured with the plaintext circuit design.

An electronic system is provided in another embodiment. The system includes a programmable IC and a memory. The memory is coupled to the programmable IC, and the programmable IC includes programmable circuitry and a key memory. The memory is configured with a pre-configuration bitstream and a black key. The programmable IC is configured to input the pre-configuration bitstream and configure the programmable circuitry to implement a pre-configuration circuit. The pre-configuration circuit includes a physically unclonable function (PUF) circuit and an unwrapper circuit. The unwrapper circuit is configured to input the black key and generate a red key as a function of the black key using a PUF value from the PUF circuit, and store the red key in the key memory.

A non-transitory computer-readable medium is provided in another embodiment. The computer-readable medium has stored instructions for protecting a circuit design for a programmable integrated circuit (IC). The instructions when executed by a processor cause the processor to perform operations including configuring the programmable IC to implement a registration circuit. The registration circuit is configured to generate a black key, which is then stored in a memory circuit external to the programmable IC. The instructions further cause the processor to configure the programmable IC to implement a pre-configuration circuit. The pre-configuration circuit is configured to input the black key from the memory circuit and generate a red key from the black key. The instructions further cause the processor to input a ciphertext circuit design to a decryption circuit on the programmable IC. The decryption circuit is configured to decrypt the ciphertext circuit design into a plaintext circuit design using the red key, erase the red key from the programmable IC, and initiate reconfiguration of the programmable IC with the plaintext circuit design.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

Figure 1:
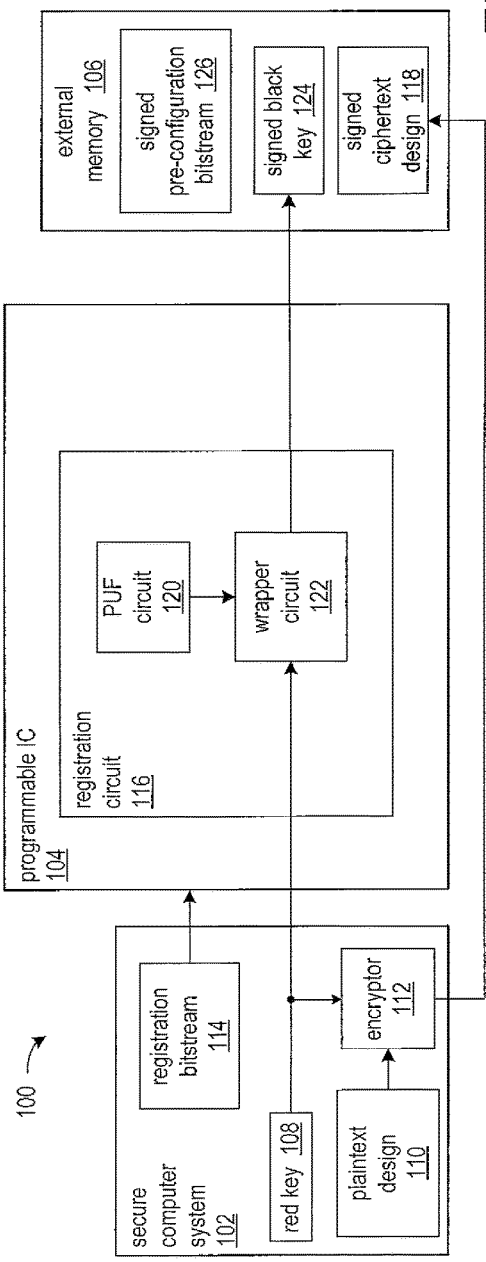
FIG. 1 shows a system for preparing a black key and a ciphertext circuit design.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Some newer devices have hardwired physically unclonable functions (PUFs), which enable off-device storage of black keys. A hardwired PUF is a circuit that is permanently wired on an IC die. The circuitry of a hardwired PUF is not reconfigurable. Older devices, however, may not have built-in PUFs and have relied on on-device storage of black keys. On-device storage of a black key typically requires a battery backup or on e-fuses for permanent storage. Both batteries and e-fuses require significant device space, and batteries may create maintenance issues.

The disclosed methods and circuits provide protection of designs to be implemented on devices without built-in PUFs. The disclosed approaches use a soft PUF, which is a PUF that is implemented on programmable logic and interconnect resources of a programmable integrated circuit (IC). The underlying circuitry on which a soft PUF is implemented may be reconfigured to implement a different function in an application circuit design. As with hardwired PUFs supporting off-device storage of decryption keys, soft PUFs may also support off-device storage of keys when used in accordance with the disclosed circuits and methods. Authentication of the soft PUF provides protection against attacks attempting to uncover details of the soft PUF. A soft PUF may be changed if a new vulnerability is discovered after the soft PUF has been used. A soft PUF may thereby be advantageous over a hard PUF.

In the disclosed approaches, within a secured environment, a registration circuit on a programmable IC generates a black key from a red key using a soft PUF on the programmable IC during a registration phase. The black key is stored in a memory circuit external to the programmable IC. The "red" key is a version of a key in which the key is not hidden, and the key may be learned through simple observation. The "black" key is a version of the key in which the key is hidden, such as through encryption or key splitting.

During a configuration phase, a pre-configuration circuit on the programmable IC inputs the black key and uses the soft PUF to unwrap the black key and generate the red key. The red key is temporarily stored in volatile key memory of the programmable IC. A ciphertext circuit design may then be input to the programmable IC, and a decryption circuit on the programmable IC decrypts the ciphertext circuit design using the red key and initiates configuration of the programmable IC to implement the plaintext circuit design. Once the ciphertext circuit design has been decrypted, the decryption circuit erases the red key from the memory of the programmable IC.

Figure 2:
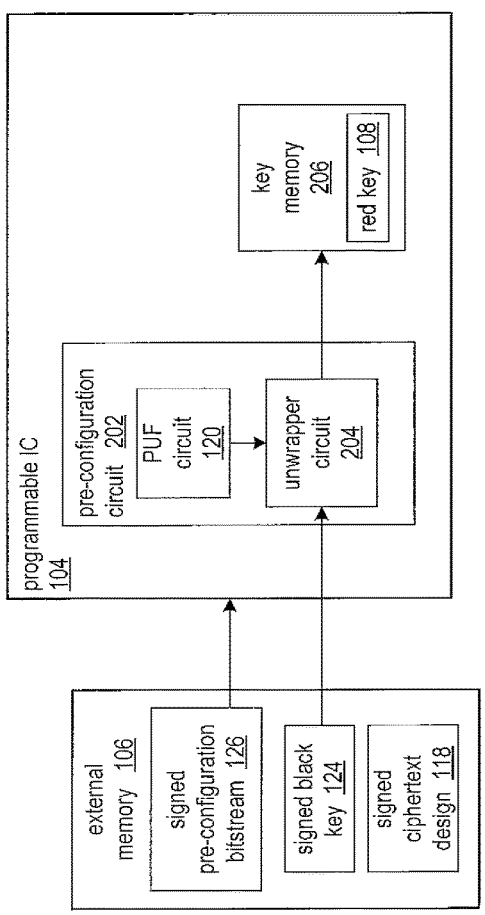
FIG. 2 shows a system for decrypting the encrypted design using the external black key.
Figure 3:
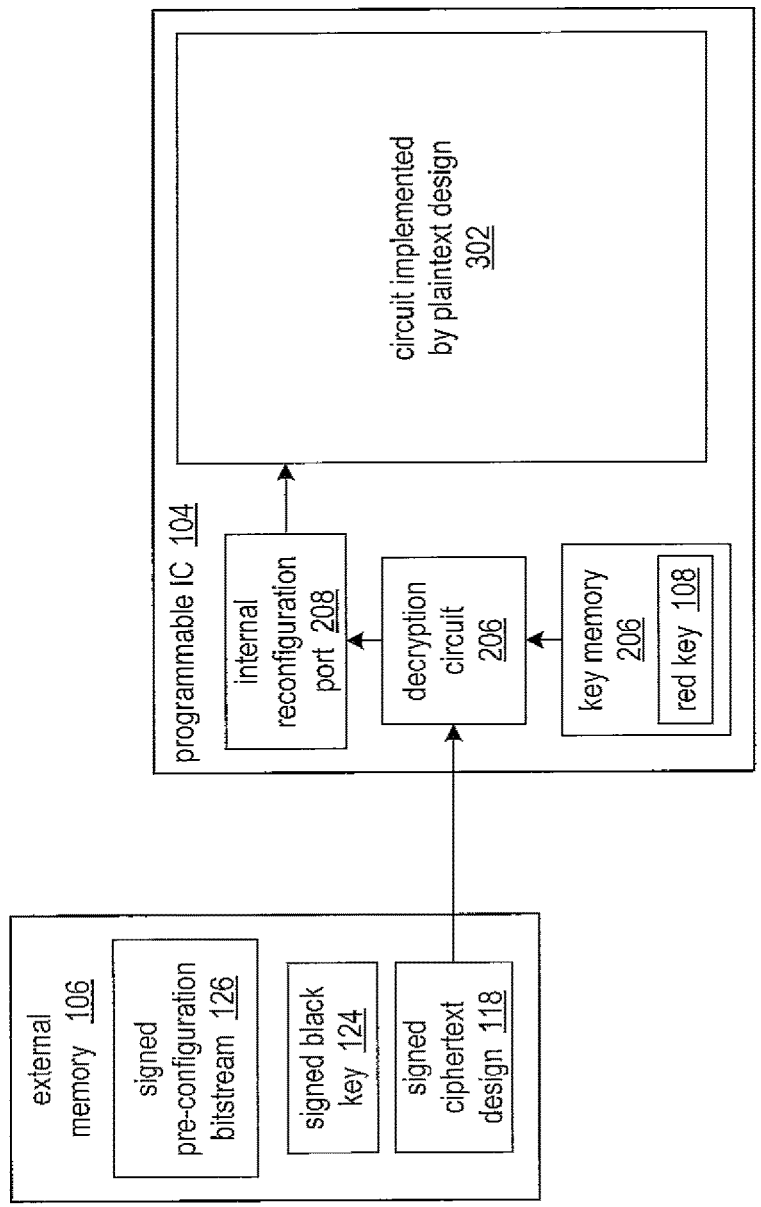
FIG. 3 shows the programmable IC having the circuit implemented by the plaintext design.

FIGS. 1, 2, and 3 show a sequence in which a circuit design targeted to a programmable IC is protected, and a secure process is used to subsequently configure the programmable IC with the protected circuit design. FIG. 1 shows a system 100 for preparing a black key and a ciphertext circuit design. The system generally includes a secure computer system 102, a programmable IC 104, and an external memory 106. The system may be deployed in a secure facility to which physical and network access is tightly restricted in order to prevent attackers from learning the value of the red key 108 and procuring the plaintext circuit design 110.

The secure computer system 102 is coupled to the programmable IC via recognized configuration equipment (not shown). The computer system is configured with program code that one or more processors of the computer system execute to encrypt (encryptor 112) the plaintext circuit design 110 and input a registration circuit bitstream 114 to the programmable IC 104 to configure the programmable IC to implement the registration circuit 116. A "bitstream" as used herein refers to a set of data that may be used to configure programmable logic circuits and/or program processor circuit(s) of a programmable IC. The computer system encrypts the plaintext circuit design 110 using the red key 108 as the encryption key, and signs the ciphertext circuit design so that the ciphertext circuit design may be subsequently authenticated when the time arrives to deploy the circuit design on the programmable IC. It will be recognized that depending on the particular circuit design and target programmable IC, the plaintext circuit design may include configuration data directed to programmable logic resources of a programmable IC or configuration data in combination with executable program instructions for a processor implemented on the programmable IC. The red key may be a symmetric key, and the ciphertext version of the design may be digitally signed using an asymmetric key-pair, for example.

The computer system stores the signed, ciphertext circuit design 118 in the external memory 106, which is external to the programmable IC 104. That is, the external memory is not disposed on the same IC die as the programmable IC and may be on a device that is physically separable from the programmable IC, such as within the memory hierarchy of computer system 102 or some other portable, stationary, or dedicated storage device.

The registration bitstream 114 that is input to the programmable IC 104 implements registration circuit 116 on programmable resources, such as programmable logic and interconnect circuits, of the programmable IC. The registration circuit includes a PUF circuit 120 and a wrapper circuit 122 and logic for controlling the PUF circuit and wrapper circuit. The PUF circuit may be based on a delay circuit, ring-oscillators, memory circuits, or cross-coupled latches, for example. As is recognized, the PUF circuit generates a PUF value that is unique to the programmable IC 104 in response to an input challenge. That is, it is highly unlikely that the same PUF circuit implemented on another instance of the programmable IC would generate the same PUF value.

The function of the wrapper circuit 122 is to hide the value of the red key 108. The wrapper circuit inputs the red key 108 and uses the PUF value from the PUF circuit 120 to obscure the red key. The red key 108 may be part of the registration bitstream 114, or read from the secure computer system by the wrapper circuit. In one implementation, the wrapper circuit encrypts the red key into a black key using the PUF value as an encryption key. In another implementation, the wrapper circuit applies an XOR function between bits of the PUF value and bits of the red key to produce the black key. The registration circuit 116 may additionally digitally sign the black key using an asymmetric key-pair. The signed black key 124 is stored in the external memory 106, either by the registration circuit 116 or by the secure computer system 102.

A pre-configuration bitstream 126 may be used to securely configure the programmable IC 104 at a later time. The secure computer system may digitally sign and store the pre-configuration bitstream 126 in the external memory 106. The pre-configuration bitstream may be digitally signed using an asymmetric key-pair. The pre-configuration bitstream may authenticate the signed black key 124 and the signed encrypted design 118, as well as recover the red key from the black key and decrypt the encrypted design.

The signed ciphertext design 118, black key 124, and signed pre-configuration bitstream 126 may be stored on the same external memory 106 or on separate devices.

FIG. 2 shows a system for decrypting the encrypted design using the external black key. The programmable IC 104 authenticates the signed pre-configuration bitstream 126 and configures programmable logic and interconnect resources to implement the pre-configuration circuit 202. The signed pre-configuration bitstream may be provided to the programmable IC from the external memory by way of a computer system. Alternatively, the external memory may be a device such as a ROM that is part of an end-product package that includes the programmable IC. The end product may include support circuitry that inputs the pre-configuration bitstream to the programmable IC when powered-on.

The programmable IC includes authentication circuitry (not shown) that authenticates the signed pre-configuration bitstream 126 before permitting configuration. If the pre-configuration bitstream is authentic, the programmable IC is configured with the pre-configuration bitstream. Otherwise, configuration is halted.

The pre-configuration circuit 202 includes PUF circuit 120, unwrapper circuit 204 and logic for controlling the aforementioned circuits. The PUF circuit in the pre-configuration circuit is the same as the PUF circuit in the registration circuit 116 (FIG. 1). The pre-configuration circuit reads the signed black key 124 from the external memory, which is authenticated before inputting the key to the unwrapper circuit 204. The pre-configuration circuit halts the configuration process if authentication of the signed black key fails. Otherwise, the pre-configuration circuit enables the PUF circuit 120 to generate a PUF value and input the PUF value to the unwrapper circuit.

The unwrapper circuit 204 generates the red key from the input black key. The unwrapper circuit reverses the operation performed by the wrapper circuit 122 during the registration. The unwrapper circuit may decrypt the black key into the red key 108 using the PUF value as the decryption key. In another implementation, the unwrapper circuit applies an XOR function between bits of the PUF value and bits of the black red key to produce the red key. The pre-configuration circuit stores the red key 108 in the internal volatile key memory 206 of the programmable IC.

FIG. 3 shows the programmable IC having the circuit implemented by the plaintext design. The signed ciphertext design 118 is input to the programmable IC and authenticated by authentication circuitry (not shown) of the programmable IC. If the signed ciphertext design is not authentic, the configuration is halted. Otherwise, the ciphertext design is input to the decryption circuit 206. The decryption circuit decrypts the ciphertext design using the red key 108 read from the key memory 206. The plaintext design is input to the internal reconfiguration port 208, which includes circuitry for reconfiguring the programmable IC to implement the circuit 302 specified by the plaintext design. Once the decryption is complete, the decryption circuit erases the red key from key memory 206.

Figure 4:
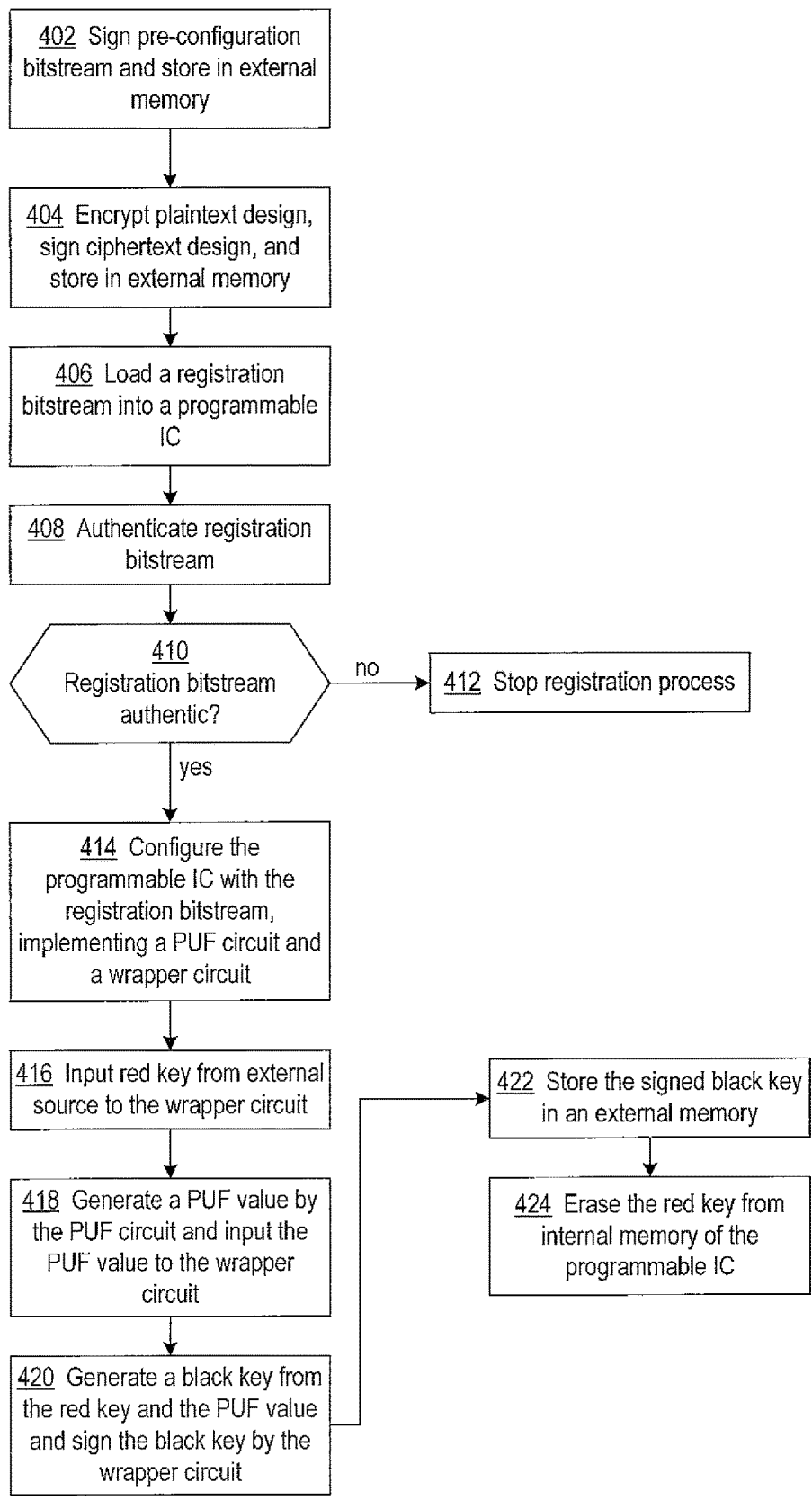
FIG. 4 shows a flowchart of a registration process that prepares a signed pre-configuration bitstream, a signed ciphertext design, and a signed black key.

FIG. 4 shows a flowchart of a registration process that prepares a signed pre-configuration bitstream, a signed ciphertext design, and a signed black key. At block 402, a pre-configuration bitstream is digitally signed and stored in an external memory. As explained above, the pre-configuration bitstream may be subsequently used to configure a programmable IC with a protected circuit design. The external memory in which the signed pre-configuration bitstream is stored is external to the target programmable IC on which the circuit design is to be implemented.

The circuit design that is to be deployed on the target programmable IC is encrypted at block 404. The plaintext circuit design is encrypted using a red key as the encryption key, and the resulting ciphertext circuit design is stored in the external memory.

At block 406, a registration configuration bitstream is loaded into the programmable IC. At block 408, the registration configuration bitstream is authenticated. Decision block 410 determines whether or not the registration bitstream is authentic. Authentication may be through a message authentication code or through a digital signature applied to the registration bitstream. If authentication fails, the registration process is stopped at block 412. Otherwise, the process continues at block 414.

At block 414, programmable logic circuit resources of the programmable IC are configured to implement a registration circuit as specified by the registration configuration bitstream. The registration circuit includes a PUF circuit and a wrapper circuit as described above. The registration circuit further includes logic that controls the sequence of operations for preparing the black key.

At block 416, the red key is input from an external source to the wrapper circuit. The external source may be the secure computer system that signed the pre-configuration bitstream and encrypted and signed the circuit design, for example. The PUF circuit generates a PUF value at block 418, and the PUF value is input to the wrapper circuit. At block 420, the wrapper circuit generates a black key from the input red key using the PUF value to hide the red key. In one implementation, the PUF value is used as an encryption key to encrypt the red key into the black key. In another implementation, the PUF value is XOR'd with the red key to generate the black key. The wrapper circuit also protects the black key with a message authentication code or with a digital signature.

At block 422, the signed black key is stored in the external memory, either by the registration circuit or by the secure computer system. The red key is erased from internal memory of the programmable IC at block 424, such as by storing a pattern of logic values different from the red key in the memory location of the red key.

Figure 5:
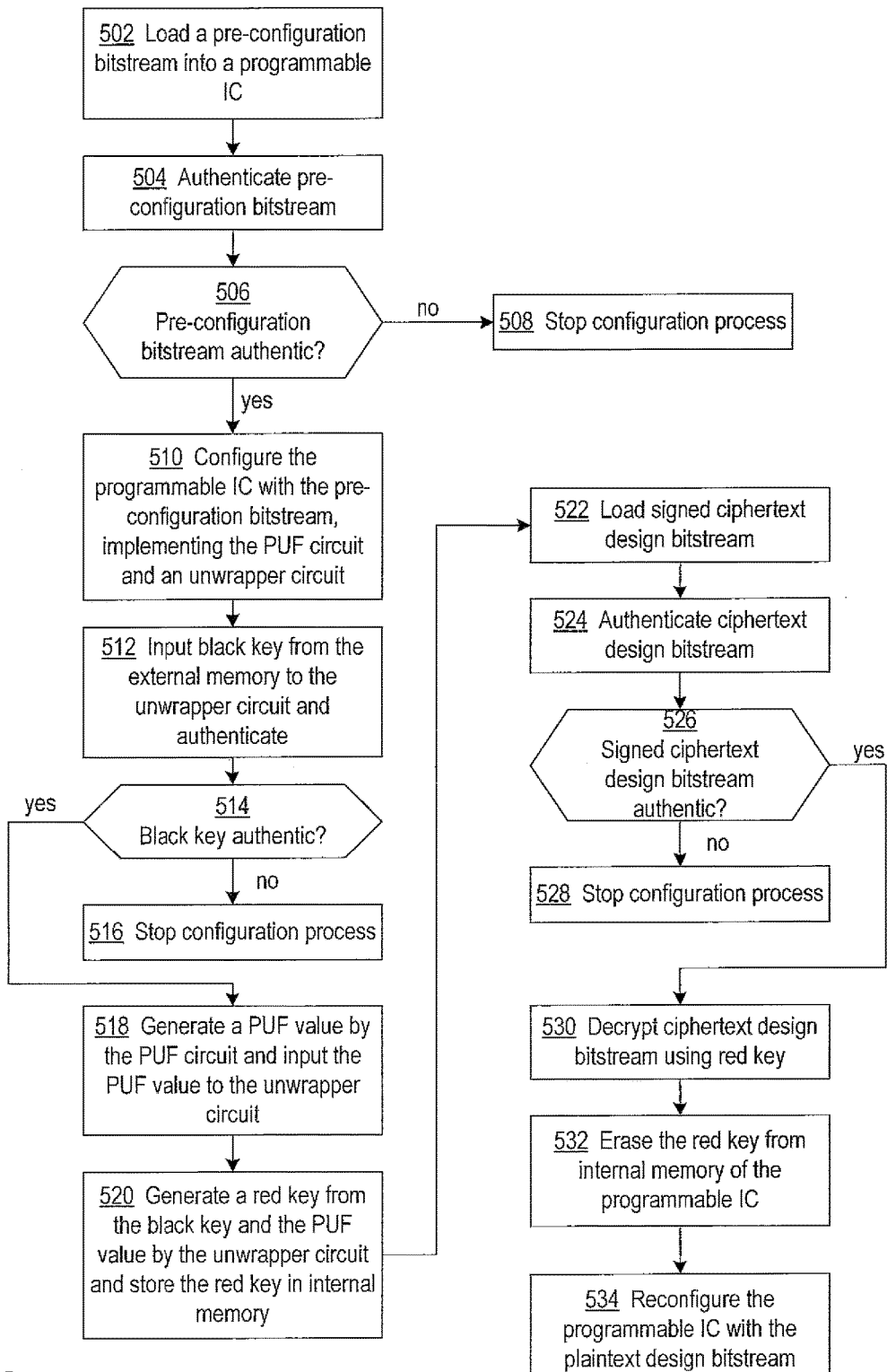
FIG. 5 shows a flowchart of a process that configures a programmable IC with the ciphertext circuit design using the externally stored black key.

FIG. 5 shows a flowchart of a process that configures a programmable IC with the ciphertext circuit design using the externally stored black key. At block 502, the signed pre-configuration bitstream is input to the programmable IC, and at block 504, the signed pre-configuration bitstream is authenticated. If the signed pre-configuration bitstream is not authentic, decision block 506 directs the process to block 508 and the configuration process is stopped. Otherwise, the configuration process continues at block 510.

At block 510, programmable logic and interconnect resources of the programmable IC are configured with the pre-configuration bitstream, which implements the pre-configuration circuit that includes a PUF circuit, unwrapper circuit, and logic circuit for controlling the PUF circuit and unwrapper circuit. The pre-configuration circuit inputs the black key from the external memory at block 512 and determines whether or not the black key is authentic at decision block 514. If the black key is not authentic, the configuration process is stopped at block 516. Otherwise the process continues at block 518.

A PUF value is generated by the PUF circuit, and the PUF value is input to the unwrapper circuit at block 518. At block 520, the unwrapper circuit generates the red key from the input black key and the PUF value and stores the red key in internal key memory of the programmable IC. Depending on the approach used to generate the black key, the red key may be recovered by decrypting the black key using the PUF value as a decryption key or by applying an XOR function between bits of the black key and bits of the PUF value.

At block 522, the signed ciphertext design bitstream is input to the programmable IC, and at block 524, the signed ciphertext design bitstream is authenticated. If the signed ciphertext design bitstream is not authentic, decision block 526 directs the process to block 528 at which the configuration process is stopped. Otherwise, the process continues at block 530.

The ciphertext design is decrypted at block 530 using the recovered red key, and the red key is erased from the internal key memory of the programmable IC at block 532, such as by storing a pattern of logic values different from the red key in the memory location of the red key. At block 534, the programmable IC is reconfigured with the plaintext circuit design bitstream.

In another aspect, a non-transitory computer-readable medium may be provided. The non-transitory computer-readable medium may be a flash memory or other device suitable for storing program instructions. The computer-readable medium may be configured with instructions stored for protecting a circuit design for a programmable integrated circuit (IC). The instructions when executed by a processor cause the processor to perform a number of operations. The operations include configuring the programmable IC to implement a registration circuit. The registration circuit is configured to generate a black key and store the black key in a memory circuit external to the programmable IC. The operations further include configuring the programmable IC to implement a pre-configuration circuit. The pre-configuration circuit is configured to input the black key from the memory circuit and generate a red key from the black key. The operations further include inputting a ciphertext circuit design to a decryption circuit on the programmable IC. The decryption circuit is configured to decrypt the ciphertext circuit design into a plaintext circuit design using the red key, erase the red key from the programmable IC, and initiate reconfiguration of the programmable IC with the plaintext circuit design.

Figure 6:
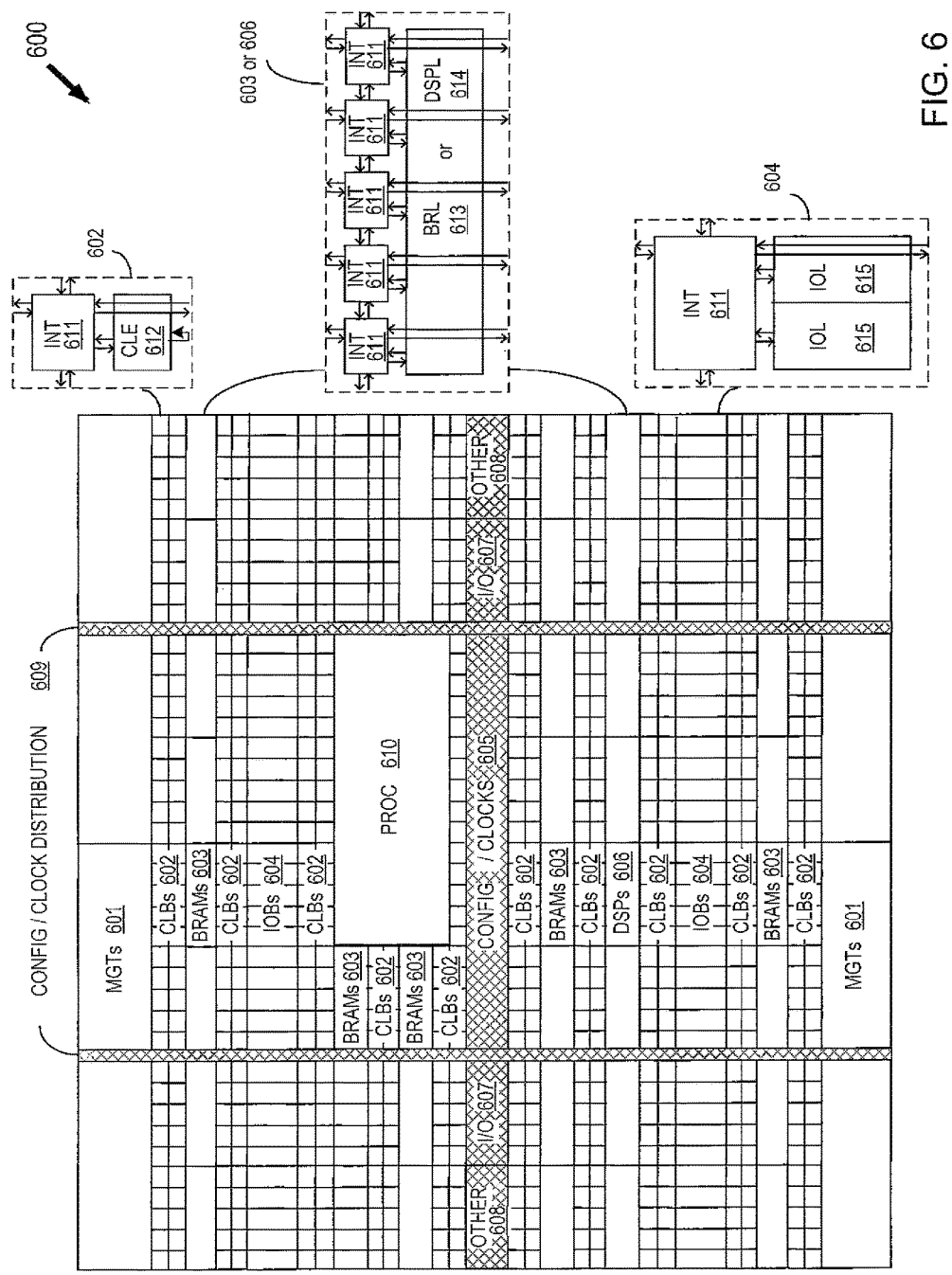
FIG. 6 shows an example programmable logic IC on which the disclosed circuits and processes may be implemented.

FIG. 6 shows an example programmable logic IC on which the disclosed circuits and processes may be implemented. The programmable logic and interconnect circuitry, as described further below, may be configured to implement the disclosed registration circuit, pre-configuration circuit, and circuit of the plaintext design.

FIG. 6 illustrates a programmable IC in accordance with a field programmable gate array (FPGA) architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as power control circuitry, digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured FPGA, a horizontal area near the center of the die (shown shaded in FIG. 6) is used for configuration, clock, and other control logic. Vertical areas 609 extending from this horizontal area are used to distribute the clocks and configuration signals across the breadth of the FPGA.

Some FPGAs utilizing the architecture illustrated in FIG. 6 include additional logic blocks that disrupt the regular row structure making up a large part of the FPGA. The additional logic blocks can be programmable blocks and/or dedicated logic. For example, the processor block PROC 610 shown in FIG. 6 spans several rows of CLBs and BRAMs.

Note that FIG. 6 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for authentication. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of protecting a circuit design for a programmable integrated circuit (IC), comprising:
   configuring programmable logic and interconnect resources of the programmable IC to implement a first instance of a Physically Unclonable Function (PUF) circuit and a registration circuit;
   generating a first instance of a PUF value by the first instance of the PUF circuit;
   generating a black key from an input first instance of a red key and the first instance of the PUF value by the registration circuit;
   storing the black key resulting from the generating of the black key in a memory circuit external to the programmable IC;
   reconfiguring the programmable logic and interconnect resources of the programmable IC to implement a second instance of the PUF circuit in a pre-configuration circuit;
   generating a second instance of the PUF value by the second instance of the PUF circuit;
   inputting the black key from the memory circuit to the pre-configuration circuit;
   generating a second instance of the red key from the black key and the second instance of the PUF value by the pre-configuration circuit;
   decrypting a ciphertext circuit design into a plaintext circuit design by the programmable IC using the second instance of the red key;
   erasing the second instance of the red key from the programmable IC; and
   reconfiguring the programmable IC with the plaintext circuit design.

2. The method of claim 1, wherein the configuring the programmable IC to implement the pre-configuration circuit includes:
   inputting a pre-configuration bitstream to the programmable IC;
   authenticating the pre-configuration bitstream; and
   halting the configuring of the programmable logic and interconnect resources of the programmable IC to implement the pre-configuration circuit in response to the pre-configuration bitstream failing the authenticating.

3. The method of claim 2, further comprising:
   inputting the ciphertext circuit design to the programmable IC;
   authenticating the ciphertext circuit design; and
   halting the reconfiguring of the programmable logic and interconnect resources of the programmable IC with the plaintext circuit design in response to the ciphertext circuit design failing the authenticating.

4. The method of claim 1, wherein the generating the second instance of the red key includes:
   authenticating the black key; and
   halting the generating of the second instance of the red key, the decrypting, the erasing and the reconfiguring in response to the black key failing the authenticating.

5. A method of protecting a circuit design for a programmable integrated circuit (IC), comprising:
   configuring programmable logic resources and programmable interconnect resources of the programmable IC to implement a registration circuit that includes a first instance of a Physically Unclonable Function (PUF) circuit and a wrapper circuit;
   generating a first instance of a PUF value by the first instance of the PUF circuit;
   inputting a first instance of a red key to the wrapper circuit;
   generating a black key by the wrapper circuit as a function of the first instance of the PUF value and the first instance of the red key;
   storing the black key resulting from the generating of the black key in a memory circuit external to the programmable IC;
   reconfiguring the programmable logic resources and programmable interconnect resources of the programmable IC to implement a pre-configuration circuit that includes a second instance of the PUF circuit and an unwrapper circuit;
   generating a second instance of the PUF value by the second instance of the PUF circuit;
   inputting the black key from the external memory circuit to the unwrapper circuit;
   generating a second instance of the red key by the unwrapper circuit as a function of the black key and the second instance of the PUF value;

inputting a ciphertext circuit design to the programmable IC;
decrypting the ciphertext circuit design into a plaintext circuit design by a decryption circuit of the programmable IC using the second instance of the red key;
erasing the second instance of the red key from the programmable IC; and
reconfiguring the programmable logic resources and programmable interconnect resources of the programmable IC with the plaintext circuit design.

6. The method of claim 5, wherein:
the generating of the black key includes:
   encrypting the first instance of the red key using the first instance of the PUF value as an encryption key; and
the generating of the second instance of the red key includes:
   decrypting the black key using the second instance of the PUF value as a decryption key.

7. The method of claim 5, wherein:
the generating of the black key includes:
   XORing the first instance of the red key with the first instance of the PUF value; and
the generating of the second instance of the red key includes:
   XORing the black key with the second instance of the PUF value.

8. The method of claim 5, wherein the reconfiguring the programmable IC to implement the second instance of the PUF circuit and the unwrapper circuit includes:
inputting a pre-configuration bitstream to the programmable IC;
authenticating the pre-configuration bitstream; and
halting the reconfiguring of the programmable logic resources and programmable interconnect resources of the programmable IC to implement the second instance of the PUF circuit and the unwrapper circuit in response to the pre-configuration bitstream failing the authenticating.

9. The method of claim 8, further comprising:
authenticating the ciphertext circuit design; and
halting the reconfiguring of the programmable logic resources and programmable interconnect resources of the programmable IC with the plaintext circuit design in response to the ciphertext circuit design failing the authenticating.

10. The method of claim 5, wherein the generating the second instance of the red key includes:
authenticating the black key; and
halting the generating of the second instance of the red key, the decrypting, the erasing and the reconfiguring in response to the black key failing the authenticating.

11. An electronic system, comprising:
a computer system: a programmable integrated circuit (IC) coupled to the computer system and including programmable logic resources, programmable interconnect resources circuitry and a key memory;
a memory circuit coupled to the programmable IC and external to the programmable IC;
wherein the computer system is configured to provide a registration bitstream to the programmable IC for configuring the programmable logic resources and programmable interconnect resources to implement a wrapper circuit and a first instance of a Physically Unclonable Function (PUF) circuit;
wherein the first instance of the PUF circuit is configured to generate a first instance of a PUF value, and the wrapper circuit is configured to generate a black key from an input first instance of a red key and the first instance of the PUF value and store the black key resulting from generation of the black key in the memory circuit;
wherein the memory circuit is configured with a pre-configuration bitstream;
wherein the programmable IC is configured to input the pre-configuration bitstream and configure the programmable logic resources and programmable interconnect resources to implement a pre-configuration circuit, and the pre-configuration circuit includes a second instance of the PUF circuit and an unwrapper circuit;
wherein the unwrapper circuit is configured to input the black key and generate a second instance of the red key as a function of the black key using a second instance of the PUF value from the second instance of the PUF circuit, and store the second instance of the red key in the key memory; and
wherein the programmable IC is further configured to:
   input a ciphertext circuit design;
   decrypt the ciphertext circuit design into a plaintext circuit design using the second instance of the red key;
   erase the second instance of the red key from the key memory; and
   reconfigure the programmable logic resources and programmable interconnect resources with the plaintext circuit design.

12. The system of claim 11, wherein the unwrapper circuit is further configured and arranged to decrypt the black key using the second instance of the PUF value as a decryption key.

13. The system of claim 11, wherein the unwrapper circuit is further configured and arranged to XOR the black key with the second instance of the PUF value.

14. The system of claim 11, wherein the programmable IC is configured and arranged to:
authenticate the pre-configuration bitstream; and
halt configuration of the programmable logic resources and programmable interconnect resources of the programmable IC to implement the pre-configuration circuit in response to the pre-configuration bitstream failing authentication.

15. The system of claim 11, wherein:
the programmable IC is configured and arranged to authenticate the black key; and
halt generation of the second instance of the red key in response to the black key failing authentication.

* * * * *